(12) United States Patent
Gile et al.

(10) Patent No.: US 6,202,012 B1
(45) Date of Patent: Mar. 13, 2001

(54) ELECTRONIC CONTROL SYSTEM FOR A MACHINE

(75) Inventors: David V. Gile, East Peoria; Vernon R. Smith, Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/235,787

(22) Filed: Jan. 22, 1999

(51) Int. Cl.7 ...................................................... G06F 7/00
(52) U.S. Cl. .............................. 701/48; 701/33; 701/36; 307/9.1; 370/235
(58) Field of Search ............................ 701/48, 33, 35, 701/36; 307/9.1; 340/825.16, 825.05; 370/235

(56) References Cited

U.S. PATENT DOCUMENTS

| | | | |
|---|---|---|---|
| 4,654,890 | 3/1987 | Hasegawa et al. | 455/607 |
| 4,715,012 | 12/1987 | Mueller et al. | 364/900 |
| 4,924,391 | * 5/1990 | Hirano et al. | 701/33 |
| 4,949,083 | * 8/1990 | Hirabayashi et al. | 340/825.05 |
| 5,224,124 | 6/1993 | Hamano et al. | 375/37 |
| 5,313,104 | 5/1994 | Shibata et al. | 307/101 |
| 5,467,272 | 11/1995 | Yoshida et al. | 701/36 |
| 5,687,081 | 11/1997 | Wellman et al. | 364/424.07 |
| 5,699,250 | * 12/1997 | Kobayashi | 701/48 |

FOREIGN PATENT DOCUMENTS 0 734 905 A2    10/1996  (EP) .

* cited by examiner

*Primary Examiner*—William A. Cuchlinski, Jr.
*Assistant Examiner*—Yonel Beaulieu
(74) *Attorney, Agent, or Firm*—David H. Chervitz; W. Bryan McPherson III

(57) ABSTRACT

An electronic control system for controlling operation of a machine is described. The system includes a first control system connected to a first electronic control module, a second control system connected to a second electronic control module, and a first data link connected between the first electronic control module and the second electronic control module for transmission of data between the first control system and the second control system. The first data link provides transmission of data at a high speed.

9 Claims, 3 Drawing Sheets

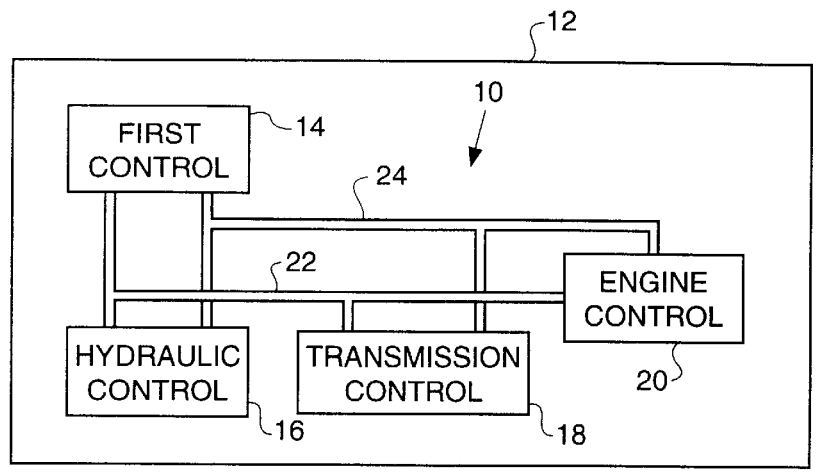
Fig-1-
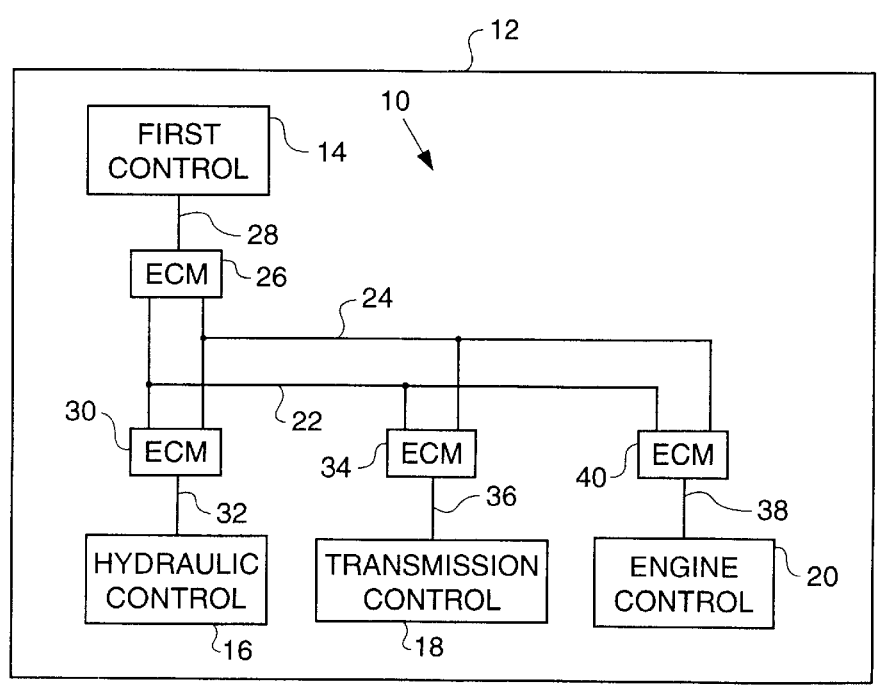
Fig-2-

Fig-3-
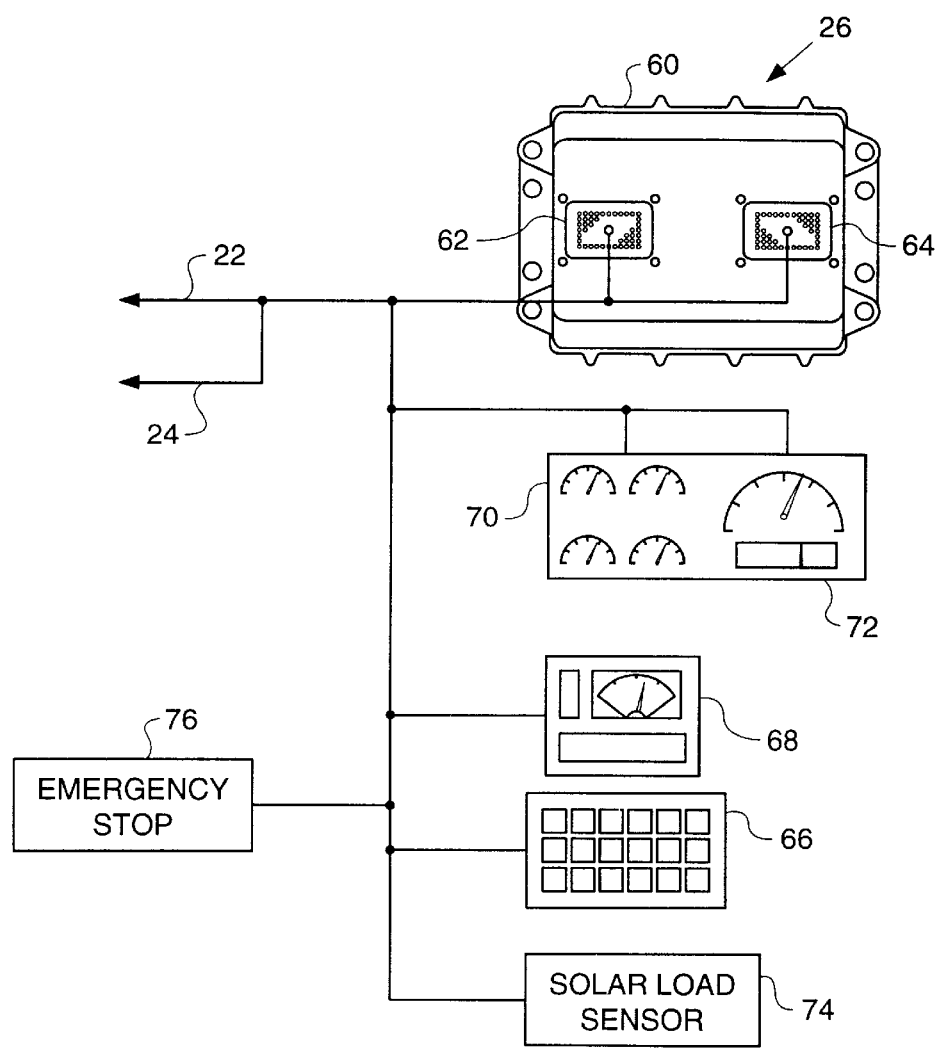

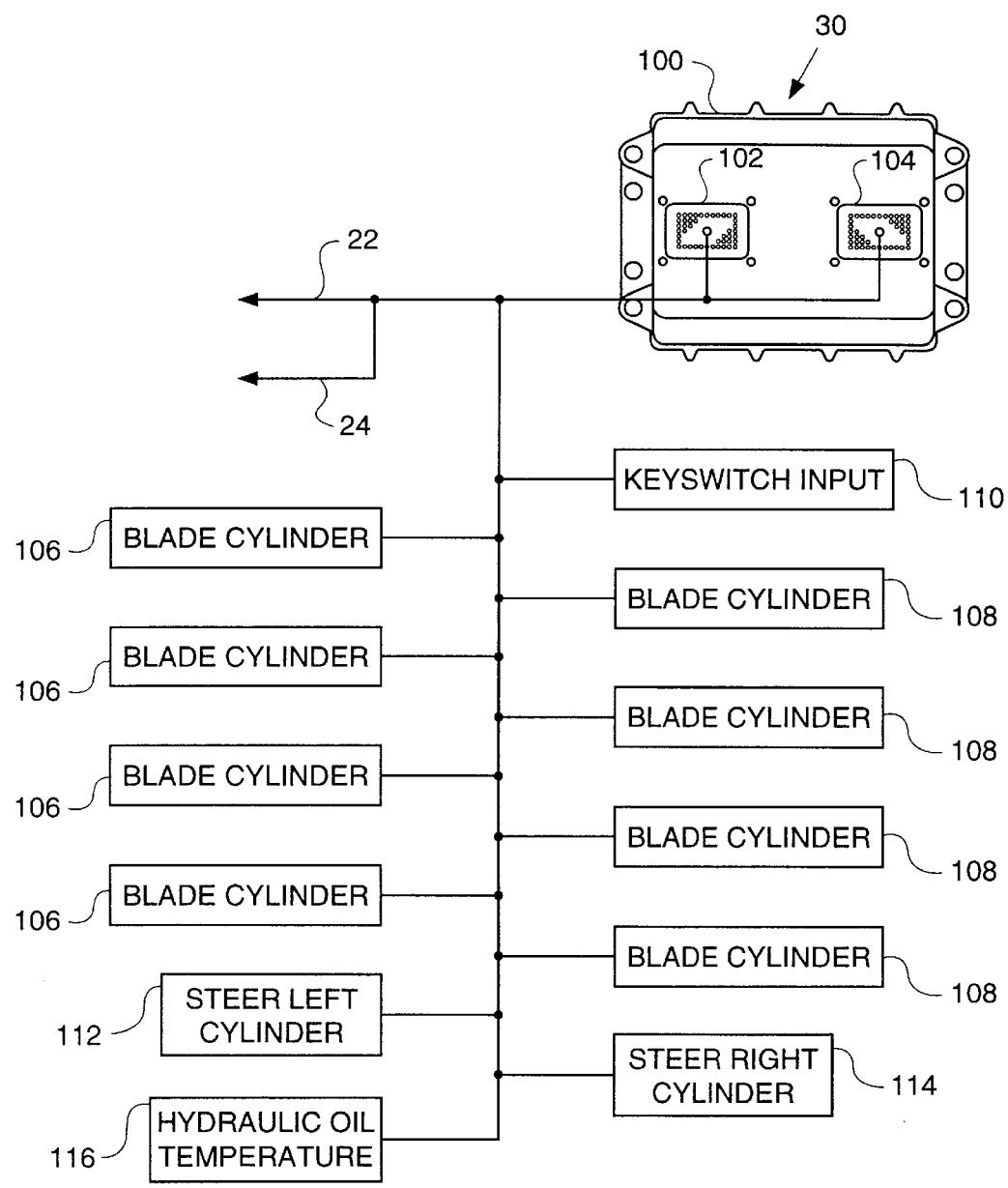

ELECTRONIC CONTROL SYSTEM FOR A MACHINE

TECHNICAL FIELD

The present invention relates generally to machine control systems and more particularly to an electronic control system for a machine which is capable of controlling one or more functions among a plurality of systems within a machine.

BACKGROUND ART

When controlling large machines, such as track-type tractors and other construction and mining machines, it is desirable to control various systems or subsystems within the machine. For example, such machines have a central control system, an HVAC system, a hydraulic control system, an engine control system, a transmission or drivetrain control system, and a resolver module system, which each need to be controlled or monitored by an operator. In order to facilitate control or operation of all of these systems it is required to individually connect each of the systems through the machine to a central location, such as a cab where an operator is positioned. Running wiring or cabling from each of the systems to the cab results in a complex machine which increases the time and cost to assemble such a machine. Additionally, connection of each system to the central location typically requires mechanical connectors or linkages which add to the cost to design and manufacture the machine. The mechanical connections, due to their size and bulk, take up additional space within the machine and increase the time and difficulty in constructing a machine. The use of mechanical linkages also adds to problems associated with maintenance and repair of the machine. It is often times difficult to determine what is causing a problem when mechanical connectors or systems are employed within a machine. Again, mechanical connectors add to the time required to determine where a problem exists in a machine and this adds to the cost to repair the problem.

Accordingly, the present invention is directed to overcoming one or more of the problems as set forth above.

DISCLOSURE OF THE INVENTION

In one aspect of the present invention an electronic control system for controlling operation of a machine is provided which comprises a first control system connected to a first electronic control module, a second control system connected to a second electronic control module, and a first data link connected between the first electronic control module and the second electronic control module for transmission of data between the first control system and the second control system.

In another aspect of the present invention an electronic control system for controlling operation of a machine is provided with the system comprising a first control system connected to a first electronic control module, a plurality of other control systems each being connected to an electronic control module, and a data link connected between the first electronic control module and the other electronic control modules for transmission of data between the first control system and the other control systems.

In yet another aspect of the present invention an electronic control system for a machine is provided with the machine including a first control system, a hydraulic control system, a transmission control system, and an engine control system, the electronic control system comprising an electronic control module connected to each of the systems, a first data link for connecting each of the electronic control modules together for transmitting data between all of the control systems over the first data link, and a second data link for connecting each of the electronic control modules together for transmitting data between all of the control systems over the second data link.

BRIEF DESCRIPTION OF DRAWINGS

FIG. 1 is a block diagram of an electronic control system for a machine constructed according to the present invention;

FIG. 2 is a schematic diagram of the electronic control system constructed according to the present invention;

FIG. 3 is a top perspective view of an electronic control module showing various connections thereto; and FIG. 4 is a top perspective view of another electronic control module showing various connections thereto.

BEST MODE FOR CARRYING OUT THE INVENTION

Referring to the drawings, numeral 10 in FIG. 1 is an electronic control system for controlling the operation of a machine 12. The electronic control system 10 comprises a first control system 14, such as a cab control system, which is used to control certain operations of the machine 12. For example, the machine 12 may take the form of a track-type tractor which may function to move earth at a construction site. The first control system 14 is adapted to control such functions as those associated with a hydraulic control system 16, a transmission control system 18, and an engine control system 20. The first control system 14 is connected to the other control systems 16–20 via a first data link 22 and a second data link 24. The first data link 22 may be a high speed serial communications system transmitting data at a rate of 250 Kbaud. The second data link 24 may also be a serial communications system transmitting data at a lower rate, such as 62.5 Kbaud, than that of the first data link 22. Data transmitted over the second data link 24 may be less time critical than data transmitted over the first data link 22. For example, data transmitted over the first data link 22 may consist of signals which control or monitor operation of the various control systems 16, 18, and 20. Further, data transmitted over the second data link 24 may be information concerning the state of one of the control systems 16, 18, and 20. The first control system 14 is connected in such a manner by use of the data links 22 and 24 so that control of the machine 12 is distributed and all electronic. Additionally, since the connections between the first control system 14 and the other control systems 16–20 are all electrical or electronic there is no need for any mechanical mechanisms, linkages, or connections. Although the second data link 24 has been described as being a low speed data link, it is also possible for the second data link 24 to be a high speed data link transferring data at the same speed as that as the first data link 22. Further, the data links 22 and 24 may each be a parallel communication system or a fiber optic data link.

FIG. 2 illustrates a more detailed functional block diagram of the electronic control system 10 for controlling the operation of the machine 12. The electronic control system 10 has the first control system 14 connected to an electronic control module (ECM) 26 via a wire 28. Although a wire 28 connection is shown it should be understood that there may be more than one wire or even a bus type arrangement for connecting the first control system 14 to the ECM 26. The ECM 26 is also connected to the data links 22 and 24 to communicate data or information from the ECM 26 to the first control system 14. Additionally, data or information is sent from the first control 14 to the ECM 26. Another ECM 30 is connected to the hydraulic control system 16 by a connection 32 and in this manner information from the first control system 14 may be sent to the hydraulic control system 16 and also information or data may be transmitted over the data links 22 and 24 from the hydraulic control system 16 to the first control system 14. The transmission control system 18 is connected to an ECM 34 over a wire 36 with the ECM 34 also being connected to the data links 22 and 24. Again, information or data is passed through the ECM 34 to the ECM 26 in order for the first control 14 to control or monitor operation of the transmission control 18. Additionally, the engine control system 20 is connected to the data links 22 and 24 through a wire 38 which is connected to an ECM 40.

The data links 22 and 24 provide means for transferring data between the ECM's 26, 30, 34, and 40. Each of the ECM's 26, 30, 34, and 40 are connected to transmit signals to operate or control components in its associated control system and to receive information from its associated control system. Information received from each of the control systems is used to determine if the machine 12 is functioning properly. As an example, oil pressure from the engine control system 20, which is not critical information or data, may be transmitted over the second data line 24 to be monitored by an operator within the first or cab control system 14. By way of another example, control of the throttle, which is highly critical data, is provided from the first control system 14 to the engine control system 20 over the first data link 22. The data links 22 and 24 also provide for redundancy within the electronic control system 10 in the event that one of the data links 22 or 24 should fail to operate.

With reference now to FIG. 3, a perspective view of the ECM 26 which is connected to the first control system 14 is illustrated. The ECM 26 has an outer housing 60 and, for purposes of example only, two seventy pin connectors 62 and 64 which are used to connect the ECM 26 to the data links 22 and 24 and to the first control system 14. The first control system 14 may be connected to various devices which are used to control operation of the machine 12. In particular, for example, the first control system 14 may include a keypad device 66, a message center module 68, and gauges 70 and 72. The first control system 14 is also capable of monitoring the speed and direction of the machine 12 and monitoring the engine control system 20. Other devices or sensors may also be connected to the first control system 14, such as a solar load sensor 74 and an emergency stop switch 76. Various other well known devices or sensors associated with the machine 12 may also be connected to the first control system 14.

The ECM 26 has incorporated therein processing means such as a microcontroller or a microprocessor and memory means such as memory chips with examples being ROM, RAM, EEPROM, a flash EPROM chip, or equivalent memory chips or devices. Either the processing means or the memory means has stored therein a program for controlling and monitoring operations of the machine 12. With the use of a service tool (not shown) the program stored in the flash EPROM chip, for example, may be changed or updated through a communication adapter (not shown). In this manner the appropriate software file may be downloaded to change or burn the new software into the flash EPROM chip. The ECM 26 transmits several different types of signals including signals to operate the other control systems 16–20 within the machine 12 and also receives different types of signals from the other control systems 16–20. In this manner, there is distributed control of the machine 12.

FIG. 4 illustrates a perspective view of the ECM 30 which is connected to the hydraulic control system 16. The ECM 30 has an outer housing 100 and two seventy pin connectors 102 and 104 which are used to connect the ECM 30 to the data links 22 and 24 and to the hydraulic control system 16. The two seventy pin connectors 102 and 104 are for example only and it is to be understood that other connectors are intended and contemplated. As discussed above, the data links 22 and 24 are connected to the ECM 30 and various operations of the hydraulic control system 16 are controlled and monitored from the first control system 14. The hydraulic control system 16 may be connected to various devices which are used to control operation of the machine 12. In particular, for example, the hydraulic control system 16 may include various blade cylinder extend valves 106 and blade cylinder retract valves 108, a keyswitch input 110, a steer left valve 112, and a steer right valve 114. The hydraulic control system 16 is also capable of monitoring various functions of the hydraulic control system 16 such as by a hydraulic oil temperature sensor 116 which is also connected to the ECM 30. Other devices or sensors may also be connected to the hydraulic control system 16 as is required.

The ECM 30 has incorporated therein processing means such as a microcontroller or a microprocessor and memory means such as memory chips with examples being ROM, RAM, EEPROM, a flash EPROM chip, or equivalent memory chips or devices. Either the processing means or the memory means has stored therein a program for controlling and monitoring operations of the hydraulic control system 16. The ECM 30 is capable of transmitting several different types of signals to the first control systems 14 and also receiving different types of signals from the first control system 14. In this manner the first control system 14 is able to control and monitor the operation of the hydraulic control system 16.

The other ECM's 34 and 40 are constructed in a similar manner and have outer housings and two seventy pin connectors which are used to connect the ECM's 34 and 40 to the data links 22 and 24. Additionally, and similar to the ECM's 26 and 30, the ECM's 34 and 40 likewise include processing means such as a microcontroller or a microprocessor and memory means such as memory chips with examples being ROM, RAM, EEPROM, a flash EPROM chip, or equivalent memory chips or devices. Either the processing means or the memory means has stored therein a program for controlling and monitoring operations of the particular control system to which the ECM 34 and 40 are connected. As can be appreciated, other control systems may be added to the machine 12 by inserting an ECM between the newly added control system and connecting the new ECM to the data links 22 and 24. Again, once the new ECM is connected in the system 10 by being connected to the data links 22 and 24 the new control system is able to communicate with the other control systems 14, 16, 18, and 20.

INDUSTRIAL APPLICABILITY

The electronic control system 10 of the present invention provides for simple design, assembly, repair, and maintenance of the machine 12. The electronic control system 10 increases the reliability of the machine 12 by reducing the number of parts and connections required to assemble the machine 12. With, the present invention, the electronic control system 10 is simplified over prior art systems due to the reduced number of connections and wiring which is required within the machine 12. The electronic control system 10 provides for all electronic control of the various control systems within a machine 12 and is particularly adapted for use on a wide variety of work machines such as construction and mining machines, track-type tractors, off highway trucks, wheel loaders and the like. The electronic control system 10 of the present invention also provides for an integrated architecture which allows for new systems to be easily designed and added to an existing machine.

Other aspects, objects and advantages of the present invention can be obtained from a study of the drawings, the disclosure and the appended claims.

What is claimed is:

1. An electronic control system for controlling operation of a machine, the system comprising a first control system connected to a first electronic control module, a second control system connected to a second electronic control module, a first data link connected between the first electronic control module and the second electronic control module for transmission of data between the first control system and the second control system, and a second data link connected between the first electronic control module and the second electronic control module for transmission of data between the first control system and the second control system, the first data link transmitting data at a high speed, and the second data link transmitting data at a speed less than the first data link transmission speed.

2. The electronic control system of claim 1 further comprising a third control system connected to a third electronic control module, and the first data link being connected between the first electronic control module, the second electronic control module, and the third electronic control module for transmission of data between the first control system, the second control system, and the third control system.

3. The electronic control system of claim 2 wherein the first, second, and third electronic control modules each comprise a housing having a pair of connectors.

4. The electronic control system of claim 2 further comprising a second data link connected between the first electronic control module, the second electronic control module, and the third electronic control module for transmission of data between the first control system, the second control system, and the third control system.

5. An electronic control system for controlling operation of a machine, the system comprising a first control system connected to a first electronic control module, a second control system connected to a second electronic control module, and a first data link connected between the first electronic control module and the second electronic control module for transmission of data between the first control system and the second control system, and a second data link connected between the first electronic control module and the second electronic control module for transmission of data between the first control system and the second control system, the first data link transmitting data at a high speed, and the second data link transmitting data at the same speed as that of the first data link.

6. An electronic control system for controlling operation of a machine, the system comprising a first control system connected to a first electronic control module, a plurality of other control systems each being connected to an electronic control module, a first data link connected between the first electronic control module and the other electronic control modules for transmission of data between the first control module and the other control modules, and a second data link connected between the first electronic control module and the other electronic control modules for transmission of data between the first control module and the other control modules, the first data link transmitting data at a high speed, the second data link transmitting data at a speed less than the speed of the first data link transmission speed.

7. An electronic control system for controlling operation of a machine, the system comprising a first control system connected to a first electronic control module, a plurality of other control systems each being connected to an electronic control module, a first data link connected between the first electronic control module and the other electronic control modules for transmission of data between the first control module and the other control modules, and a second data link connected between the first electronic control module and the other electronic control modules for transmission of data between the first control module and the other control modules, the first data link transmitting data at a high speed, the second data link transmitting data at the same speed as that of the first data link.

8. An electronic control system for a machine, the machine including a first control system, a hydraulic control system, a transmission control system, and an engine control system, the electronic control system comprising an electronic control module connected to each of the systems, a first data link for connecting each of the electronic control modules together for transmitting data between all of the control systems over the first data link, and a second data link for connecting each of the electronic control modules together for transmitting data between all of the control systems over the second data link the first data link transmitting data at a high speed and the second data link transmits data a speed less than the speed of the first data link transmission speed.

9. An electronic control system for a machine, the machine including a first control system, a hydraulic control system, a transmission control system, and an engine control system, the electronic control system comprising an electronic control module connected to each of the systems, a first data link for connecting each of the electronic control modules together for transmitting data between all of the control systems over the first data link, and a second data link for connecting each of the electronic control modules together for transmitting data between all of the control systems over the second data link the first data link transmitting data at a high speed and the second data link transmits data at the same speed as that of the first data link.

* * * * *